United States Patent [19]
Buff et al.

[11] 4,101,753
[45] Jul. 18, 1978

[54] FLASH WELDING APPARATUS AND METHOD

[75] Inventors: Grier E. Buff, Gadsden; Talmadge V. Phillips, Ragland, both of Ala.

[73] Assignee: Republic Steel Corporation, Cleveland, Ohio

[21] Appl. No.: 653,837

[22] Filed: Jan. 30, 1976

[51] Int. Cl.² .............................................. B23K 11/04
[52] U.S. Cl. ....................................... 219/97; 219/110
[58] Field of Search ................... 219/97, 100, 109, 110

[56] References Cited
U.S. PATENT DOCUMENTS

| | | | |
|---|---|---|---|
| 2,322,052 | 6/1943 | Ogden et al. | 219/109 |
| 2,694,762 | 11/1954 | Ruetschi | 219/110 |
| 3,341,685 | 9/1967 | Paton et al. | 219/100 |
| 3,445,768 | 5/1969 | Ferguson | 219/109 |
| 3,980,857 | 9/1976 | Sciaky | 219/97 |

*Primary Examiner*—J. V. Truhe
*Assistant Examiner*—Clifford C. Shaw
*Attorney, Agent, or Firm*—Watts, Hoffmann, Fisher & Heinke Co.

[57] ABSTRACT

Improved apparatus and method for performing flash welding is disclosed. The apparatus moves adjacent surfaces of workpieces toward each other and applies electrical energy between them for flash heating the surfaces in a flashing step, after which it forces the surfaces together in an upsetting step, while continuing the application of the electrical energy for a predetermined time. Apparatus is provided for monitoring the amount of electrical energy applied to the workpieces during welding, along with control circuitry, for calculating and limiting the amount of electrical energy applied during the upset step to a predetermined function of that applied during the flashing step. An energy recorder produces an indication of the amount of electrical energy applied to the workpieces during welding.

7 Claims, 11 Drawing Figures

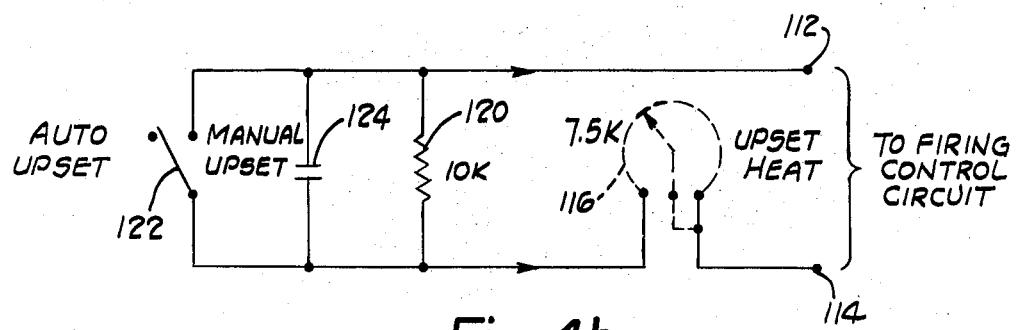
Fig. 4b
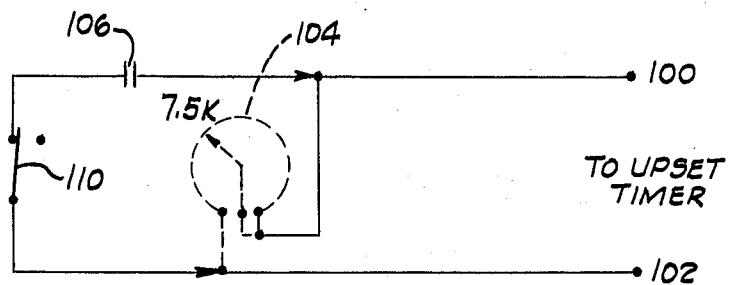
Fig. 4c
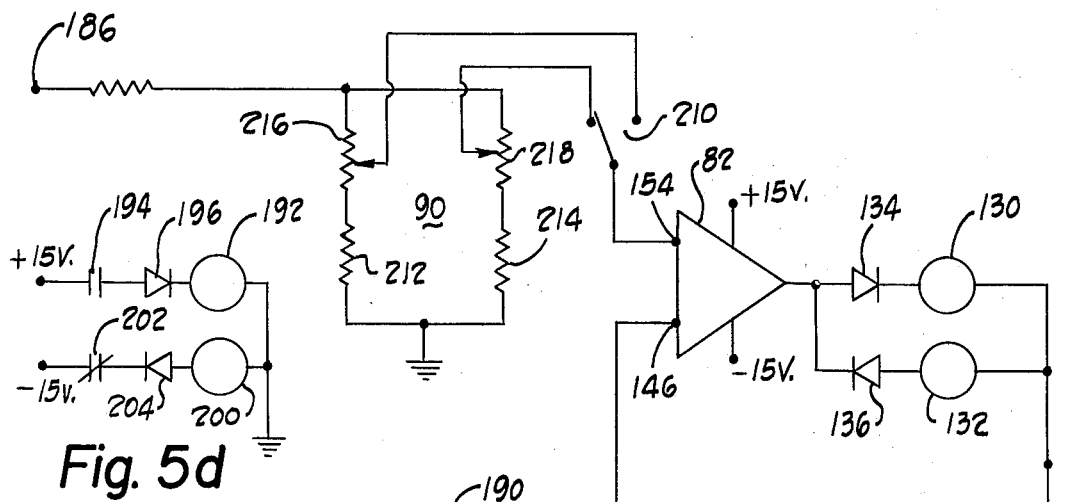
Fig. 5d
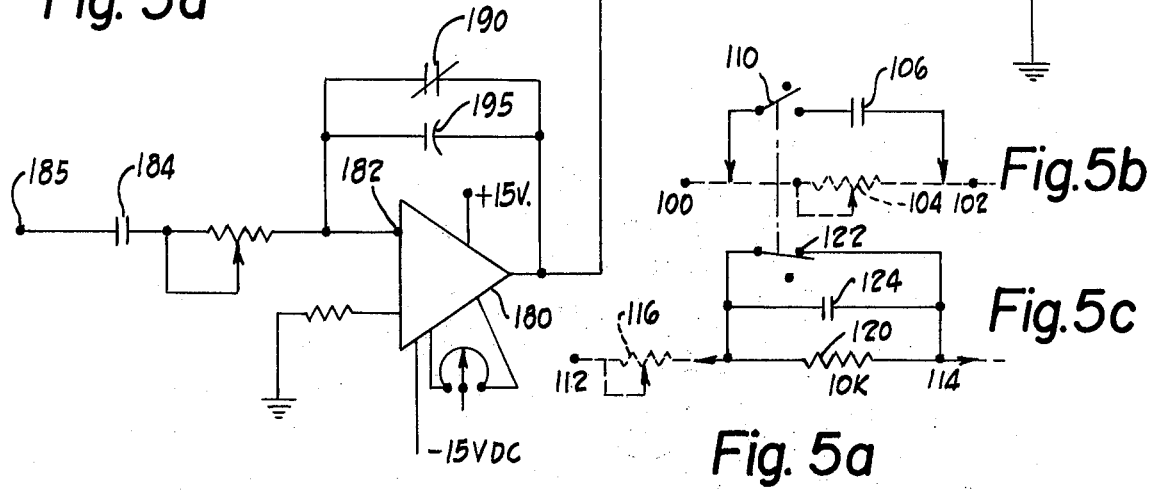
Fig. 5b
Fig. 5c
Fig. 5a

FLASH WELDING APPARATUS AND METHOD

BACKGROUND OF THE INVENTION

1. Field of the Invention

This invention relates to the field of flash welding and, more specifically, to an improved apparatus and method for repeatedly effecting sound and uniform flash welds between sections of strip material.

2. Description of the Prior Art

Steel strip products are typically manufactured from steel slabs known as billets. A billet is heated and hot-rolled to produce relatively thick strips of steel which are subsequently further processed.

The strip manufacturing operations which are performed subsequent to hot-rolling utilize relatively long steel strips. The strips formed in the hot-rolling operation are typically end welded together to provide strips of sufficient length for relatively continuous and efficient operations such as pickling and cold-rolling.

The welds which connect hot-rolled strips together ideally should be virtually indistinguishable from the metal in the strips themselves so that the weld material can form a part of a finished product made from strip steel. In addition, and perhaps of more importance, welds must be sufficiently flexible and durable to permit subsequent strip forming operations to be performed without weld failure.

A weld failure during a cold-rolling operation, as an example, causes significant problems. Costly production interruptions will result. In addition, a failed weld may result in severe damage to steel processing equipment such as cold-rolling equipment.

During a strip welding operation the strips formed by hot-rolling are passed through a shearing apparatus which cuts off irregular material from each end of each strip. The amount of material cut off is sufficient to provide uniform strip ends.

A flash welder is then used to weld adjacent ends of four to five coils together, to form a longer strip. The longer strips formed by welding several strips together are processable at a faster rate than if the strips were processed separately. Set-up time is reduced for the various operations when handling the larger coils, since fewer set-ups are needed to process a given amount of steel when larger size coils or longer strips are processed.

A welding method often used to join adjacent strips end to end is known as flash butt welding. In flash butt welding two strips together, the respective adjacent ends of the strips to be welded together are each clamped to a different one of a pair of conductive and relatively movable platens. The end portions are moved toward each other, and subjected to flashing and upsetting steps, during which electric current is passed between the strip ends to heat the metal to effect the weld.

In the flashing step, the adjacent strip ends are progressively moved toward each other over a predetermined travel distance of about 0.4 to 0.8 inches, by relative motion of the platens accomplished by use of a hydraulic motive system. An electrical voltage is applied between the ends through the conductive platens. When the ends have moved sufficiently close to contact each other, this voltage causes an electric current to flow between the workpieces. When this contact occurs, it establishes a series of many localized shorts between the two adjacent edges which result in a high current density in these shorts. This high density, localized current heats areas of contact. This series of localized shorts or "bridges," spreads over the length of the weld, as the platens and the adjacent ends are progressively moved closer together, until the entire region near the adjacent ends reaches a temperature high enough to melt the material for fusing. The flashing step requires approximately 1 to 2 seconds on some welders and 8 to 20 seconds on other welders.

After the flashing step, the weld is completed by forcing the molten ends together under heavy pressure with the hydraulic system in the upsetting step, while continuing the application of the electrical potential. The prior practice has been to maintain the electrical current between the strip ends during the upsetting step for a substantially fixed predetermined period of time and then cut off the electric power to the weld. The upsetting force unites the molten metal at the adjacent ends, and also displaces undesirable slag, or oxidized material, which may be present. The electrical current must be maintained during the upset long enough to maintain the fusing temperature for the metal until the weld is effected, but not long enough to blow out more molten metal than necessary from the region of the weld.

After the weld is completed by the upsetting step, the excess metal is trimmed off, ideally leaving a relatively smooth and uniform area of joinder between the strips. The weld should have a homogeneous composition corresponding to that of the parent material of the strip steel product. The welding operation should not weaken the metal adjacent the weld.

Apparatus for providing the electric heating current for welding has included a source of 440 volt alternating current, a multitapped step down transformer, and a switching circuit capable of controlling and transmission of AC phase controlled and stepped down power from the source to the platens. Rectified and stepped down power is delivered between the conductive platens and, hence, between the clamped strip ends. When a weld is to be made, the switching circuit is switched to transmit electric power, and the hydraulic system is actuated to advance the platens and adjacent clamped strip ends toward each other, to execute the flashing step.

Apparatus is provided to sense when the strip ends have advanced to within a predetermined distance of each other (called the "upset position") and, in response, to initiate the upset step. In upset, the ends are moved almost instantaneously against each other and the current continues to flow for a predetermined time, after which it is cut off. The edges are then allowed to cool for a predetermined "hold time" before unclamping the platens from the joined strip ends and trimming.

The amount of electrical energy applied during the welding operation has a significant effect on the quality of the welds made. Previous attempts to control energy have concentrated on attempting to adjust the energy applied during the flashing step. Apparatus has been provided to hopefully regulate the amount of energy so applied. This apparatus included means for adjusting parameters of the electrical power transmission, such as transformer tap adjustments. Mechanical adjustments were also made to regulate flashing energy, such as adjustments of the velocity of platen motion and of the limits of the relative travel path of the platens.

The time during which the application of electric current is continued during the upset step, on the other hand, has been determined empirically and has been held substantially constant for a given range of gauges and type of strip material welded, since energy control for the entire welding cycle was purportedly effected by the controls exercised in the flashing step. Usually the time for upset current was set at a uniform maximum value, to avoid excessive upset heating, which would often blow out material from the weld and weaken it.

The switching circuit consisted of a pair of so-called "ignitrons" (single anode pool tubes with igniter electrodes) connected in known fashion as a phase control switch. The means for adjusting the power delivered by the switching circuit included two potentiometers, one for governing the flashing power, and one for the upset power. The potentiometers were connected in known fashion to do this by controlling the phasing of the ignitions, i.e., to regulate the time during each electrical cycle during which the ignitions were actuated to pass electric power to the transformer primary from the source.

Notwithstanding these elaborate efforts to control the energy applied in making welds, far too many welds failed under the stresses of subsequent processing. The parameter adjustments discussed above were imprecisely made and often were seemingly ineffective. The set-up procedure required considerable operator skill and experience.

The attempted energy-related adjustments introduced a number of variables into the set-up procedures for making welds. Since most operators lacked sufficient skill to make the individual adjustments for each weld, aid was provided in the form of set-up charts. The set-up charts were calibrated in terms of the gauge (thickness) and type of material being welded. The operator could locate the gauge and type of material on the chart, and would find a set of corresponding recommended energy-related (and other) set-up adjustments to be made for the particular type and gauge of material to be welded.

Notwithstanding the attempts to simplify the selection of the many set-up variables, errors occurred and welds of good quality were not consistently produced.

Of necessity, the set-up charts utilized ranges of values for given set-up adjustments, rather than a given set-up value for each variable in material and size. The charts tended to be imprecise in variable selection, apparently further aggravating the problem of making good welds.

The weld failures (called "strip breaks") resulted in economic losses, including down time, damage to machinery, and scheduling interruptions. Strip breaks occurred in rolling mills, in which the gauge, or thickness of the strip material is reduced by passing it between opposed sets of heavy rollers at very high pressures and under tension. When such breaks occurred, the strip material would often fold over itself inside the mill, resulting in double or triple thicknesses of strip passing between the rollers. This often caused clogging of the mill, stopping it, and scoring and/or breakage of the rollers themselves.

The down time caused by a strip break would often be on the order of several hours. A scored roller would have to be reground to restore its surface and shape. The regrinding, of course, shortened the useful life of the roller since some of its material had to be removed. If a roller was so badly damaged that it was necessary to discard it, replacement cost would often be tens of thousands of dollars.

It is thus a main object of this invention to provide an apparatus and method for effecting flash welds of improved quality and uniformity between workpieces.

SUMMARY OF THE INVENTION

This invention relates to a method and apparatus for performing improved flash welding operations for joining together successive groups of adjacent strip workpiece edges, where the characteristics of the workpieces, such as gauge and material, differ from one group of workpieces to another.

In one aspect of the invention an improved welder apparatus is provided for applying energy to workpieces for effecting welds in a plurality of steps. The welder has a monitor for sensing the amount of energy applied in one step, and control circuitry for governing the amount of energy applied in another step, as a function of the sensed energy amount.

A more specific feature of the invention resides in the welder being a flash welder, and in the upset energy being a function of the energy amount applied in the flashing step.

It is believed that an explanation for the improved performance with the welder of this invention is that, contrary to previous thinking, the several previously discussed adjustments for regulating electrical energy in the flashing step have little or no effect on the actual amount of energy applied. Generally speaking, the only parameters substantially affecting flashing energy are the type of material being welded, and the amount of material rendered molten in the flashing step, i.e., the cross-sectional area of the weld times the travel path length of relative platen movement during flashing. (This is true, of course, only as long as the velocity of motion of the workpiece ends during flashing is not greater than that at which the rate of metal advance equals the rate at which the applied power can melt that metal).

For a given material type and size, and a constant travel path (burnoff length, the path length generally held constant in practice), the flashing energy is substantially constant. It has been found that if the burnoff length is held constant the cross-section of the workpiece determines the amount of flashing energy consumed in the flashing step. Tests have shown that if any dimension of the cross-section is altered, the flashing energy will change substantially in proportion to the change in the cross-sectional area. Therefore, in flash welding one cannot control the amount of flashing energy where the burnoff length and cross-section remain constant. Control over the welding energy can be effected substantially only by controlling the energy applied to the upset step. In the past, the upset energy was held substantially constant because of previous misapprehension that adjustments discussed above could effectively control the total energy of welds by adequately regulating flashing energy.

The substantial reliance on change of one variable, i.e., upset current duration, for energy control eliminates the need for many of the discussed energy-related set-up adjustement variables and materially simplifies operator set-up procedure in welding. This improvement makes set-up more rapid, and reduces the reliance on operator judgment, making possible more uniform welds.

A still more specific aspect of the invention is that the control circuitry limits the upset energy to an adjustable amount directly proportional to the flashing energy to facilitate adjustment of the total energy of the weld.

According to another feature of the invention, there is provided a method and apparatus wherein a flash welder has an energy monitor for sensing the electrical energy applied to workpieces during flashing and upset steps, and an energy recorder responsive to the monitor for producing an indication of the energy sensed by the monitor. The energy recorder provides an enduring record of the energy applied in each portion of each weld for later analysis, facilitating correlation between energy application and quality of welds.

According to a further aspect of the invention the total energy of the weld operation is determined by measuring the energy consumed in the flashing step, producing and storing a signal representing the flashing energy which also represents the effective cross-sectional area of the workpieces, and controlling the upset energy required in response to the flashing energy.

Other aspects of the invention will become apparent to those skilled in the art from examination of the following detailed description of the preferred embodiment, taken in connection with the following drawings, in which:

DESCRIPTION OF THE DRAWINGS

FIG. 5 is a schematic diagram showing another embodiment of the apparatus portion shown in block form in FIG. 3.

DESCRIPTION OF THE PREFERRED EMBODIMENT

Figure 1:
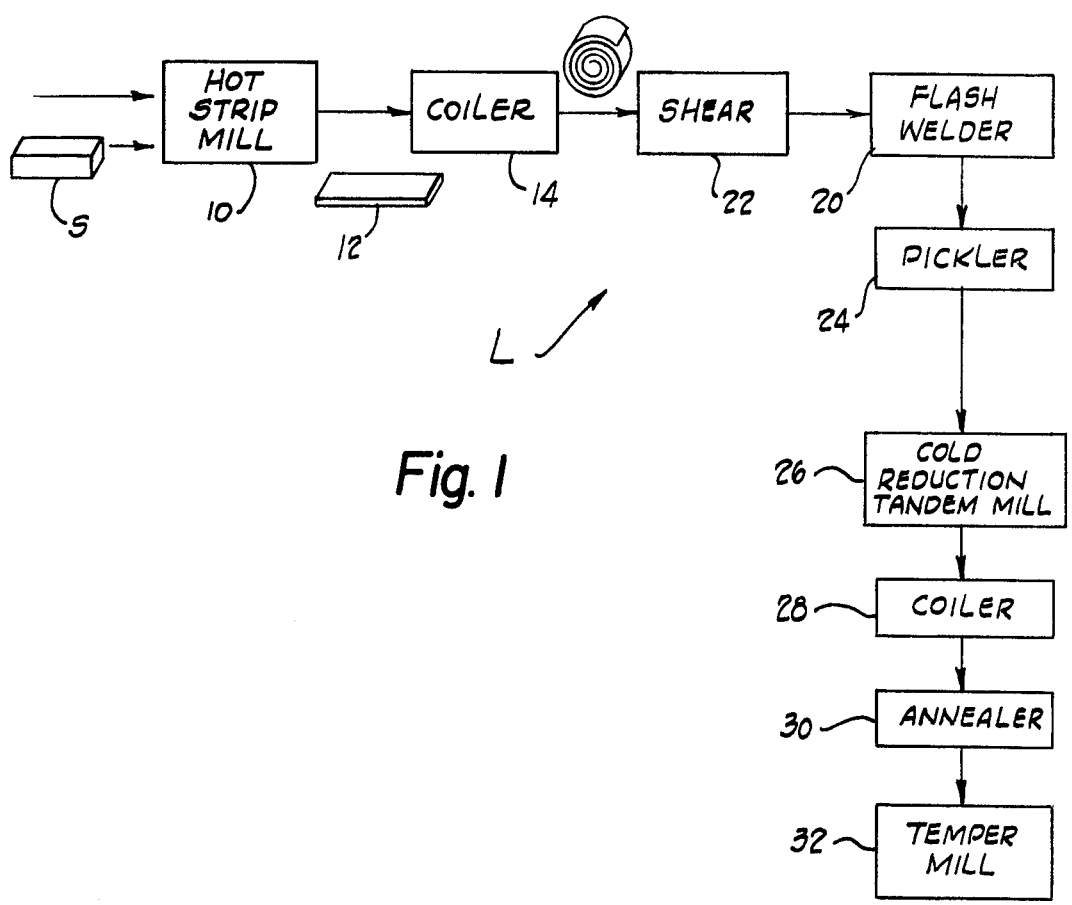
FIG. 1 is a block diagram of a strip steel-making process employing this invention.

FIG. 1 illustrates in block form apparatus constituting a processing line L in which the present invention is utilized. The processing line L makes strip steel material from steel slabs S by processing the slabs according to a number of successive steps. The line L illustrated in FIG. 1 is capable of making approximately 50,000 tons of strip steel material per month.

The steel slabs S from which the steel strip material is made are approximately 20 feet long, 4 feet wide, and 6 inches thick. The slabs are first heated to a temperature of approximately 2200° F, and forced through a hot strip mill 10 to reduce their thickness. The hot strip mill 10 includes a number of opposed pairs of rollers through which the steel slabs S are directed, to reduce their thickness from approximately 6 inches to about 0.25 to about 0.050 inches.

Each slab, reduced to strip configuration (as shown at 12 of FIG. 1), is allowed to cool to a temperature of about 1300°–1400° F and is then rolled into a coil by a coiler 14 to render it easier to handle. Each coil is between about 22 and 50 inches in width, and weighs between ten and twenty thousand pounds.

The coils of strip material are uncoiled, sheared and welded together by a flash welder 20 in groups of about five, to facilitate continuous processing of larger quantities of strip material than would be possible in processing the individual coils. A cutting apparatus 22 removes several inches of material from the ends of each coil, before welding, to eliminate rough and irregular ends, to expose regular ends of homogeneously good strip material for welding together.

After shearing, the adjacent ends of four or five coils are sequentially welded together in the flash butt welder 20, which embodies the present invention.

After the strip emerges from the hot strip mill and is coiled, it is often found to have an undesirable coating of iron oxide on its surface, about 0.0005 to 0.001 inches in thickness. This material, called "scale," must be removed to make the product suitable for further processing and to eliminate impurities.

The scale is removed by a pickler 24 in which the strip is exposed to hydrochloric acid, which chemically reacts with the scale to remove it.

The joined groups of strip material are then cold reduced. In cold reduction, the strip material is sent through a "tandem mill" 26 where it is forced between opposing pairs of rollers under high pressure and tension, reducing the gauge of the strip material down to a value as small as 0.015 inches. This step takes place at ambient temperatures.

Following cold reduction, the joined groups of strips are recoiled by a coiling apparatus 28 into large coils and sent through an annealer 30, to render the material more malleable for further processing. In the cold reduction step, a coolant consisting of approximately 6% vegetable oil in water is directed to flow over the surfaces of the strip material. The annealing is done with the strip material in its coiled condition, and, within limits, it takes no longer to anneal a large coil than a smaller one, making the annealing step considerably faster when the strip is coiled in large volume.

After annealing, the strip material is sent to the temper mill 32 to improve its hardness profile characteristics.

It is desirable that the welds between the adjacent smaller portions of strip material be as sound, uniform and homogeneous with the parent material as possible, to avoid potential breakage during subsequent processing. In operation such as cold reduction, the strip material is placed under severe stress, moving at from between 2000–3000 feet per minute, which taxes the welds previously made between the adjacent quantities of strip material. As explained above, substantial economic and other losses can occur if a weld breaks during subsequent processing of the joined strip material.

Figure 2:
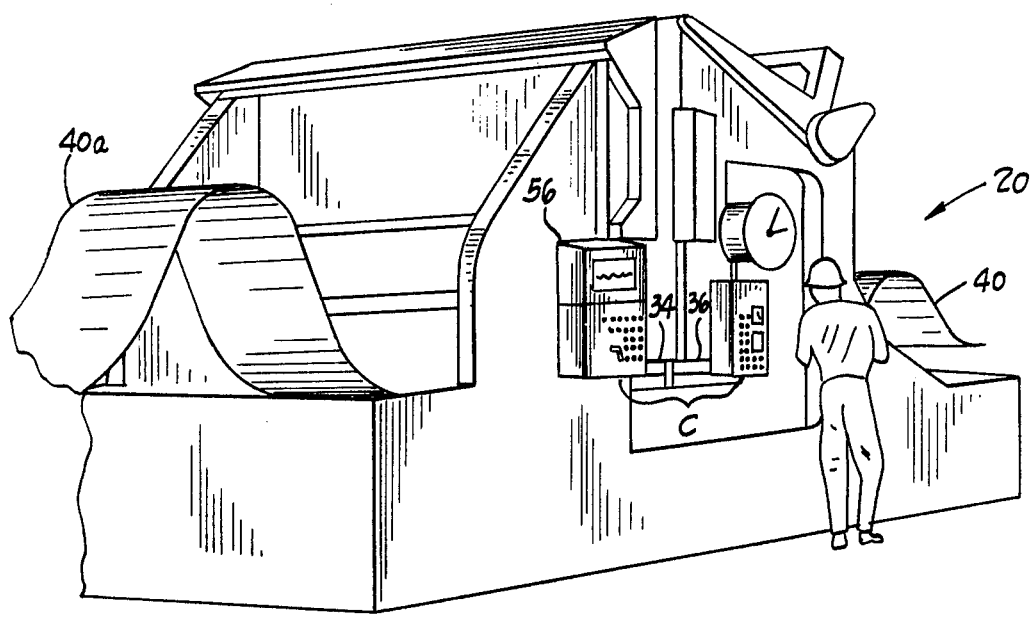
FIG. 2 is a pictorial view illustrating an apparatus portion of the system shown in FIG. 1 embodying this invention.

FIG. 2 is a pictorial view illustrating the flash welder 20 in which the present invention is incorporated. The welder 20 flash butt welds adjacent ends of steel strip material portions together, to form long continuous strips of material weighing approximately 40,000–50,000 pounds each. The material weld has a gauge (thickness) of between approximately 0.25 and 0.050 inches, and a width of approximately 22 to 50 inches.

Preferably, the flash welder into which the present invention is incorporated is known as a "52-inch Flash Welder" manufactured by the Taylor-winfield Company, of Warren, Ohio, No. 55704. The components of the welder discussed in this description are, unless otherwise noted, those provided with the above Taylor-Winfield flash welder.

Figure 3:
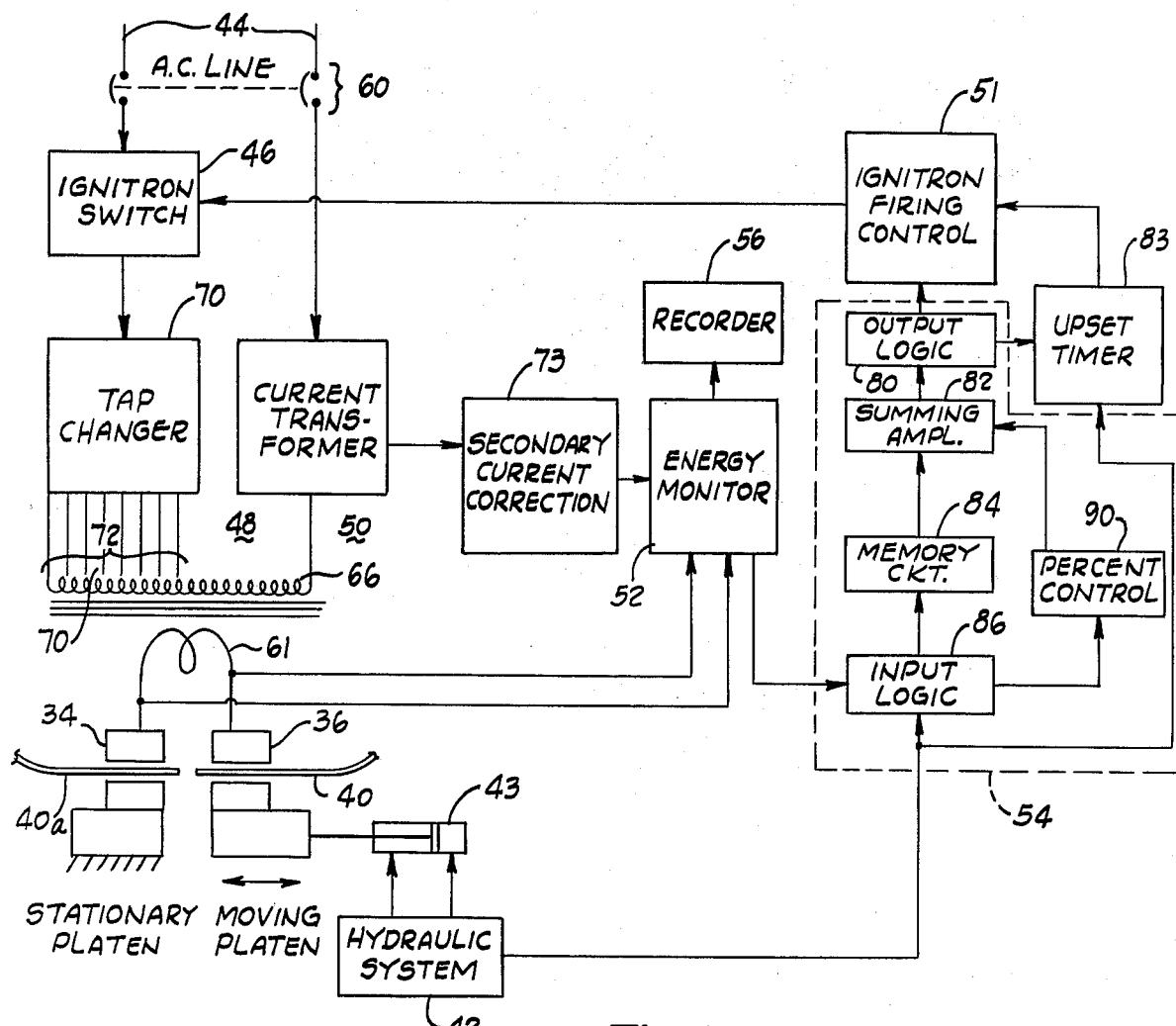
FIG. 3 is a block diagram of a portion of the apparatus shown in FIG. 2.

Referring to FIGS. 2 and 3 (FIG. 3 showing the components of the flash welder 20 in block form), two adjacent ends of steel strip material 40, 40a is fed into the welder 20 after being sheared to provide uniform ends of good quality product. One of the adjacent ends is clamped onto a stationary conductive platen 34, and the other is clamped to a movable conductive platen 36.

A spacer bar (not shown) is placed between the two ends and the movable platen 36 moves one clamped end toward the other until the two ends abut the spacer bar, after which the bar is removed.

The welder 20 flash butt welds the adjacent ends together in accordance with a flashing step and a subsequent upset step. In the flashing step, the movable platen 36 is actuated by a hydraulic system 42 connected to a hydraulic piston 43 to move the movable platen 36 toward the stationary platen 34 to move the adjacent ends of the steel strip workpieces relatively toward each other. Simultaneously, an electrical voltage is applied between the adjacent strip ends 40, 40a to heat the regions of the ends, and render the metal molten to facilitate fusing. The arcing of electric current between the workpiece ends continues at an increasing rate (constant rate in some welders) as the ends are advanced progressively closer together by motion of the platen 36.

When the platen 36 has advanced the workpiece ends to within a predetermined distance of one another, the upsetting step takes place, in which the platen 36 forces the workpiece ends together under heavy pressure, while the application of electric power between the conductive platens and the workpiece ends continues for a time. The hydraulic system produces a signal when the workpiece ends have moved to within a predetermined distance of each other, indicating the end of flashing and the beginning of the upset step.

According to the present invention, the duration of this continuation of electric power application is a function of the total electrical energy applied between the workpiece ends in the previous flashing step.

The electrical system of the welder 20 for applying the electric power between the workpiece ends is illustrated in block form in FIG. 3. The electrical system includes a source 44 of AC power, and an ignition switch 46 for controlling the transmission of electrical power to a primary circuit 48 of a step-down power transformer 50 in response to actuation of a firing control circuit 51. The power transformer 50 delivers the electric power between the conductive platens 34, 36 and the workpiece ends 40, 40a clamped in the platens.

An energy monitor 52 is connected to the transformer 50 to sense the amount of electrical energy applied between the platens and the workpiece ends during the flashing step.

According to the present invention, a control circuit 54 is provided which responds to an initiating signal to actuate the firing control circuit 51 to begin the flashing step by applying electrical energy between the workpiece ends 40, 40a. The control circuit 54 also responds to the value of the flashing energy sensed by the energy monitor 52 and to the indication from the hydraulic system 42 that the flashing step is complete to continue to actuate the firing control 51 to cause the switching circuitry 46 to continue to transmit power to the transformer 50 and between the workpiece ends for a time during the upset step which is a function of the amount of electrical energy applied between the workpiece ends during the flashing step.

An energy recorder 56 is connected to the energy monitor 52 and responds thereto to provide a graphical representation of the electrical energy applied between the workpiece ends during each welding cycle, plotted against time. From this energy recorder one can also derive the effective cross-sectional area of the weld and see if the above function was satisfied.

The AC source 44 is a known type of 440 volt, single phase, AC power supply from a General Electric Power Center, capable of producing approximately 3,000 kilowatts of electric power. This power is transmitted through a two-pole feed air circuit breaker 60 of known construction, to the switching circuitry 46. The switching circuitry 46 includes a pair of so-called "ignitron" tubes and is of a type supplied with the above-referenced Taylor-Winfield welder. The transmission of power by the switching circuitry 46 can be regulated and turned on and off by action of the firing control circuitry 51, which alters the phasing of the ignitrons to effect such control.

The transformer 50 includes the primary circuit 48, the secondary circuit 61, and a secondary current corrector 73.

The primary circuit 48 of the transformer 50 is supplied as a standard component of the Taylor-Winfield welder designated above, and includes a coil arrangement 66, and a tap-changing apparatus 70. The tap-changing apparatus 70 consists of a plurality of terminals, represented as 72, connectable at various points along the coil 66. Varying the connection of the primary circuit among the various terminals 72 regulates the voltage step-down ratio of the transformer 50. This adjustment can regulate the voltage output of the transformer 50 to between approximately 6 and 16 volts output on the secondary coil 61. The tap adjustment is useful in adjusting the current and heat load on the transformer 50 to keep it within optimum limits, notwithstanding variations in the electrical resistance between the ends of the strip workpieces which results from differences in gauge of the strip material.

A secondary current correction circuit 73 of known type is connected to the transformer primary and to the energy monitor 52 for producing a signal from the primary which is connected to represent the actual current flowing in the secondary. This signal is supplied to the energy monitor to enable it to produce its total energy output signal to indicate the amount of electrical energy applied during the welding cycle. The secondary current correction circuit 73 is a tapped current transformer or a known resistor network, by which current correction is effected.

The firing control circuit 51 is also a standard component supplied with the Taylor-Winfield welder and responds to the signal from the control circuit 54 to produce a pulse at a predetermined time during and relative to each half cycle of operation of each ignitron tube. In response to these pulses the ignitron switching package begins to conduct current from the AC source to the transformer primary, and it continues to conduct for the remainder of the associated half cycle after which it stops conducting until the occurrence of the next pulse. Thus, by governing the time (expressed in terms of phase angle degrees) at which the pulses are emitted during the respective AC half cycles, one can control the fraction of each half cycle during which the ignitron switch package conducts or transmits power to the transformer, and therefore one can, by this method, vary the amount of power so transmitted.

The firing control circuitry 51 also includes potentiometer circuitry of known construction (discussed in more detail below) which is connected in series with other circuitry (not shown) of the firing control circuit 51 for adjusting the overall resistance of this circuitry. Adjustment of this resistance controls in known fashion the phase angle of the AC half cycles at which the firing control circuitry 51 emits the pulses to the ignitrons, actuating the ignitrons to conduct for the remaining periods of the associated half cycles.

The energy monitor 52, connected to the transformer 50 for sensing electrical energy applied during welding, is a combination of a monitor, Model 901, Part No. M228; a relay board, Model No. 903, Part No. M227; and an intercommunication board, Model 902, Part No. M226, all manufactured by the Wean-United Company of Youngstown, Ohio. The energy monitor 52 produces a voltage output signal which is a function of the instantaneous total electrical energy applied between the workpiece ends during the welding cycle.

The control circuit 54 includes output logic circuitry 80 connected to receive the output of a summing amplifier 82. The summing amplifier 82 produces a signal for turning off the power to the transformer 50 upon the expiration of a time following the beginning of the upset cycle, which time is a function of the amount of electrical energy applied between the adjacent strip ends during the flashing cycle. A memory circuit 84 receives the output of the energy monitor 52 by way of input logic circuitry 86, and stores a signal having a value representing the electrical flashing energy, and hence the effective cross-section area of the workpieces. Upon the occurrence of the signal from the hydraulic system 42 indicating the end of the flashing step and the beginning of the upsetting step, the input logic actuates the memory circuit 84 and summing amplifier 82 to continue the application of electric power to the adjacent strip ends for a period of time which is a function of the value of the signal stored in the memory circuit 84. A percent control circuit 90, connected between the input logic 86 and the summing amplifier 82, can be adjusted to control the function relationship between the duration of continuation of electrical power application and the flashing energy sensed in the previous flashing step. Preferably, the functional relationship is a direct proportion.

Preferably, the embodiment of this invention also includes a known type of electronic upset timer 83, which is selectively operable as a means alternate to the control circuit 54 for limiting the duration of the upset portion of the welding cycle. The timer 83 also receives a signal from the hydraulic system 42 indicating when the platens have moved sufficiently close together to begin the upset. In the event that the timer 83 and control circuit 54 are preset (as explained below in more detail) to permit, the timer 83 responds to the signal from the hydraulic system to permit the continuation of the application of electric power for a predetermined adjustable time after which the timer actuates the firing control circuit 51 to cause the power to be cut off.

The hydraulic system 42, and the hydraulic cylinder 43, cooperate in response to an initiating signal from an operator control panel C (see FIG. 2) to initiate the flashing step by moving the movable platen 36 in a direction toward the stationary platen 34. When the movable and stationary platens 36, 34 have approached to within a predetermined distance of one another, the hydraulic system 42 initiates the upsetting step by actuating the cylinder 43 to ram the movable platen 36 with great force toward the stationary platen 34, forcing the strip ends together. At the beginning of the upset step, the hydraulic system 42 also produces a signal to the control circuit 54, indicating that the upsetting step has begun and initiating the timing out of the continuation of electrical power application during the upset portion of the welding cycle.

Figure 4D:
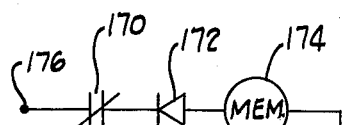
FIG. 4 is a schematic diagram of the apparatus portion shown in block form in FIG. 3.
Figure 4A:
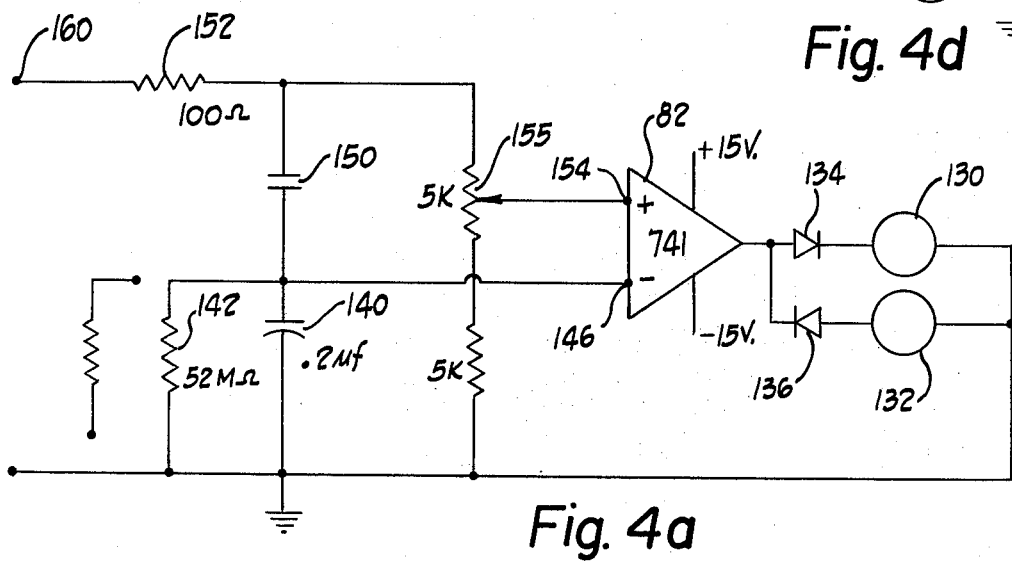

One embodiment of the control system 54 is illustrated schematically in FIGS. 4(a) 4(b) and 4(c). FIGS. 4(b) and 4(c) show portions of the control circuitry output logic 80 for controlling the operation of the ignitron tubes which transmit the electrical power for accomplishing the welds. FIG. 4(b) shows output logic circuitry for controlling the phasing of the ignitrons (i.e., the time in each AC half cycle at which these tubes begin to conduct) to assist in ceasing conduction abruptly at the desired time. FIG. 4(c) shows output logic circuitry connected to the upset timer 83 to selectively bypass and negate the control effect of the upset timer to enable control of the timing of the power application in the upset cycle in response to other signals produced by the control circuitry 54, and which are discussed in more detail below.

Referring first to the circuitry of FIG. 4(c), this circuitry includes a pair of terminals 100, 102 which are connected to the upset timer 83. The upset timer 83 is preferably a known type of electronic timer. The duration of the timing cycle of the timer 83 is an increasing function of the amount of electrical resistance between the terminals 100, 102. When the resistance between the terminals 100, 102 is negligible the timing cycle has a practically zero duration, and the timer 83 has essentially no effect whatsoever. A potentiometer 104 having adjustable resistance is connected between the terminals 100, 102. A normally-open relay contact 106 is also connected in parallel with the potentiometer 104 between the terminals 100, 102, by way of a two-position switch 110.

The circuitry of FIG. 4(c) can be selectively preset for operation in either an automatic or a manual mode. In the manual mode, the circuitry is preset to utilize and effectively insert the adjustable resistance of the potentiometer 104 in the circuitry of the timer 83 to govern the duration of the upset cycle, as controlled by the timer. Alternately, in accordance with an automatic mode, the circuitry can be preset to bypass the effect of the potentiometer 104 to determine the duration of the upset cycle in response to only the condition of the relay contact 106. The condition of the relay contact 106, as discussed more fully below, is controlled by the operation of the control circuit 54.

When the switch 110 is moved to its right-hand position, the branch of the circuit containing the contact 106 is opened, rendering ineffectual the state of that contact. Under these conditions, the operation of the timer 83 is always controlled by the amount of resistance selected on the potentiometer 104.

In the automatic mode, a switch 110 is moved to its leftward position. Under these conditions, the state of the contact 106 determines whether the potentiometer 104 is included in the circuitry of the timer 83, or is instead shorted out.

For operation in the automatic mode, wherein the switch 110 is moved to its left-hand position, the potentiometer 104 is preferably adjusted to its highest resistance setting, a setting which, if the potentiometer 104 were effectively inserted in the circuitry of the timer 83, would result in an upset cycle having a duration longer than that of any feasible welding operation. This helps assure that, in automatic operation, the timer 83 does not time out prior to the closure of the contact 106, as determined by the operation of the control circuit 54. If the timer 83 timed out before the closure of the contact 106, it would interfere with and frustrate the automatic operation of the circuit.

As will be explained more fully below, other portions of the control circuit 54 cause the contact 106 to assume a normally-open position prior to the desired time for terminating the welding cycle, and cause the contact 106 to move to a closed position upon the expiration of the desired time of the duration of the upset portion of the welding cycle, i.e., the end of the welding cycle.

FIG. 4(b) illustrates circuitry for additionally firing circuitry 51 for phasing the ignitron switching tubes to cause them to abruptly switch off the power transmission between the strip ends at the expiration of the upset cycle. The purpose of this feature is to help achieve a very abrupt termination of the power transmission, and is made necessary by the fact that the timer circuitry has an inherent time lag in its operation following the closure of the contact 106. If the timer were used alone in terminating power transmission, an undesirable delay in such termination would ensue.

This circuitry includes a pair of terminals 112, 114 connected to the firing circuitry 51. The phasing of the ignitron tubes is controlled by the amount of resistance appearing between the terminals 112, 114. As the resistance between the terminals 112, 114 increases, the ignitrons are phased in known fashion to deliver a decreasing fraction of the power available in each cycle of the AC 440 volt power supply through the ignitrons to the transformer primary, thus controlling the rate of power application to the metal to be welded.

The resistance between the terminals 112, 114 is determined by an adjustable potentiometer 116 connected in series with a resistor 120 between the terminals 112, 114. The resistance between these terminals is further controlled by the condition of a switch 122 and a normally-open relay contact 124 connected in parallel around the resistor 120.

The circuitry of FIG. 4(b) has provision for both manual control of the amount of power applied between the strip ends, and automatic mode operation, in which the power can be likewise adjusted to a predetermined rate, and the circuitry additionally assists in the rapid cessation of power delivery by the ignitrons at the end of the upset portion of the welding cycle.

In accordance with operation according to the manual mode, the switch 122 is set in its right-hand position, effectively shunting out the effect of both the resistor 120 and the contact 124. Under this condition, the only substantial resistance between the terminals 112, 114 is that established by the setting of the potentiometer 116. The potentiometer 116 can be adjusted to vary the resistance between the terminals 112, 114 to deliver a predetermined fraction of the available power from the power supply. For automatic operation, the switch 122 is moved to its left position, in which case the voltage across the resistor 120 is determined by the condition of the normally-open relay contact 124. In automatic-mode operation, the potentiometer 116 is adjusted so that it interposes the minimum amount of resistance between the terminals 112, 114. Under these conditions, the resistance between the terminals 112, 114 is between two values, i.e., substantially a zero value and the resistance of the resistor 120.

In automatic operation, the normally-open relay contact 124 is operated by the control circuitry 54, to cause the resistance between the terminals 112, 114, to rise abruptly on the expiration of the upset portion of the welding cycle, by opening of the contact 124. In accordance with this mode, the contact 124 is held in its closed position prior to the expiration of the upset portion of the cycle, shunting out the resistor 120. When the upset cycle is to be terminated, the contact 124 assumes its normally-open condition, which effectively replaces the resistor 120 in the circuit branch between the terminals 112, 114, causing the resistance between these terminals to abruptly rise and the ignitrons to be phased such that they cut off their power delivery to the transformer primary.

The operation of the contacts 106 and 124 are controlled, respectively, by the operation of a pair of relays 130, 132 (see FIG. 4(a)). When the relay 130 is actuated, the normally-open contact 106 assumes a closed position, and, when the relay 130 is deactuated, the contact 106 assumes its normally-open condition. Likewise, when the relay 132 is actuated, the normally-open contact 124 assumes a closed condition, and when the relay 132 is deactuated, the contact 124 reassumes its normally-open condition.

The operation of the relays 130, 132 is controlled by the output of the summing amplifier 82, in conjunction with a pair of diodes 134, 136. When the output of the amplifier 82 is relatively low, as it is previous to the expiration of the upset cycle, the relay 130 is deactuated, causing the contact 106 to assume its normally-open configuration and the relay 132 is actuated, causing the contact 124 to assume its closed position.

The output of the amplifier 82, upon the expiration of the duration of the upset portion of the cycle, shifts from a relative low value to a relatively high value. When the output of the amplifier 82 becomes high, the relay 130 is actuated, closing the contact 106, and the relay 132 is deactuated, opening the contact 124. This operation, as explained above, causes the resistance between the terminals 100, 102 to abruptly fall and induces the upset timer 83 to produce a signal to the firing control circuitry 51, cutting off the ignitrons and terminating the application of power between the workpieces. Additionally, the opening of the contact 124 causes the resistance between the terminals 112, 114 to rise abruptly, which serves to adjust the phase of the ignitrons to abruptly terminate their transmission of power from the power source to the metal welded ends.

The operation of the amplifier 82, and the state of its output, is determined by the memory circuitry 84, the input logic circuitry 86, and the percent control circuitry 90. The memory circuitry 84 includes a capacitor 140 and a parallel connected resistor 142. The upper terminal of the capacitor 140 and resistor 142 is connected to the noninverting input 146 of the summing amplifier 82.

The input logic circuitry includes a relay contact 150 and a surge resistor 152 connected to the inverting input 154 of the amplifier 82 by way of a potentiometer 155 which constitutes the percent control circuitry 90, as will be further explained.

The output of the energy monitor 52, which is a voltage representing the total accumulated energy dissipated in the welding cycle, is applied to the input logic circuitry at a terminal 160.

The memory circuit 84, the logic input circuitry 86 and the percent control circuitry 90 combine to cause the amplifier 82 to produce a relatively low output during the welding cycle previous to the desired termination of the upset portion of the cycle, and cause the amplifier 82 to produce a relatively high output signal upon the end of the duration of the desired duration of the upset cycle. The timing of the change of state of the output of the amplifier 82 and the consequent operation of the remainder of the control circuitry 54 to terminate the upset cycle, is dependent upon the amount of energy dissipated during the upset cycle, relative to the amount of energy applied during the flashing cycle.

At the beginning of the welding cycle, the contact 150, for reasons explained more fully below, is in a closed condition. The voltage signal from the energy monitor 52, representing the instantaneous accumulated energy of the welding cycle, is applied through the resistor 152 to the parallel RC combination consisting of the capacitor 140 and the resistor 142. This causes the voltage at the upper terminal of the capacitor 140 to rise in accordance with the voltage signal applied by the energy monitor 52 at the terminal 160. Substantially the entire voltage so applied is presented to the noninverting input terminal 146 of the amplifier 82. During this portion of the cycle, only a fraction of the voltage appearing at the terminal 160 is applied to the inverting terminal 154 of the amplifier 82 due to the fact that the potentiometer 90 is set at some intermediate value, such that less than the entire voltage drop between the right-hand terminal of the resistor 152 and ground appears at the inverting terminal. Therefore, during this portion of the cycle, the amplifier 82 produces at its output a relatively low-level signal.

At the termination of the flashing portion of the welding cycle, the relay contact 150 is caused to assume its normally-open condition. This action effectively cuts off the memory circuitry from the voltage supply appearing at the terminal 160 from the energy monitor 52, and the voltage at the upper terminal of the capacitor 140 remains substantially constant, bleeding off at a relatively slow rate through the resistor 142. While the potential at the noninverting terminal 146 remains relatively constant, the potential at the inverting terminal 154 continues to rise in accordance with the continued increase in the signal from the energy monitor 52 representing the continued energy applied during the entire welding cycle:

It can be seen that the voltage at the inverting terminal 154 will become equal to the voltage at the noninverting terminal 146 only after the signal at the terminal 160 continues to rise to a level having a value which exceeds by a predetermined fraction the value of the signal at the terminal 146 at the expiration of the flashing step. That predetermined fraction is determined by the setting of the potentiometer percent control 90.

Thus, the circuitry described in FIGS. 4(a), 4(b) and 4(c) operates to terminate the application of electrical power between the welded strip workpieces when the amount of energy applied during the upset cycle reaches a value which is a predetermined direct proportional function of the energy applied in the flashing portion of the cycle.

The operation of the contact 150 is determined by a simple relay arrangement associated with the hydraulic system 42. This is shown schematically in FIG. 4(d). This circuitry consists of a normally-closed mechanical contact 170 which is associated with the hydraulic system and responds to its motion to open or close accordingly. The mechanical contact 170 is arranged such that when the hydraulic system 42 causes the movable platen 36 to move to within a predetermined distance of the stationary platen 34, the contact 170 opens. Connected in series with the contact 170 is a diode 172 and an electrical relay 174. Normally, the contact 170 is closed, allowing current to flow from ground to a negative potential terminal 176, actuating the relay 174. This actuation of the relay causes the contact 150 to assume a closed condition, to permit the continuing build-up of charge on the capacitor 140 during flashing. When the flashing step is completed, the contact 150 opens, maintaining the charge on the capacitor 140 and preventing any further increases of such charge.

FIGS. 5(a), 5(b), 5(c) and 5(d) illustrate another embodiment of the control circuitry 54. In this alternative embodiment there is shown memory and percent control circuitry which differs from that illustrated in FIG. 4(a). The percent control circuitry 90 has a capability for adjusting the fraction of flashing energy applied during the upset step according to one of two preset ratios. The memory and associated circuitry includes means for longer term storage of the memory signal than is possible in the circuitry of FIG. 4(a).

The output logic circuitry illustrated in FIGS. 5(b) and 5(c) is substantially identical in structure and operation as the output logic circuitry illustrated in FIGS. 4(b) and 4(c). Likewise, the relays 130, 132 and the diodes 134, 136 are analogous in structure and operation to those shown in FIG. 4(a), as is the summing amplifier 82. These components bear reference numerals corresponding to their analogous components in FIGS. 4(a) – 4(c).

In this embodiment, the memory circuitry includes an operational amplifier 180 which is connected to receive the corrected power output signal from the energy monitor 52 at a terminal 182 by way of a normally-open contact 184 and a terminal 185. The output of the amplifier 180 is connected to the noninverting input terminal 146 of the amplifier 82. The output of the energy monitor 52 is also applied to the inverting terminal 154 of the amplifier 82 by way of a terminal 186 and the percent control circuitry 90.

Upon the initiation of the welding cycle, the output of the energy monitor 52 is applied to the terminals 185, 186. During this portion of the cycle, and until the end of the flashing cycle, the normally-open contact 184 is maintained in a closed position, by means described more fully below. During this time, the output of the operational amplifier 180 increases as a function of the power indicating voltage output signal applied to the terminal 182. The output of the amplifier 180 is applied to the terminal 146 of the amplifier 82. The output of the energy monitor 52, appearing at the terminal 186 is applied to the inverting terminal 154 of the amplifier 82, after attenuation by the percent control circuitry 90. This condition, as in the previous embodiment, causes the amplifier 82 to produce a relatively low output signal, actuating the contacts 106, 124 in a manner analogous to that described in connection with the previous embodiment.

At the end of the flashing cycle, the contact 184 is permitted to assume its normally-open condition and the amplifier 180 produces an output which remains constant, and which is a function of the total energy applied to the workpieces during the flashing portion of the welding cycle. The voltage applied to the terminal 154 of the amplifier 82, however, continues to rise during the upset portion, until it reaches a value which causes the output of the amplifier 82 to change state. This takes place when the signal at the terminal 186, representing the energy of the entire welding cycle, rises sufficiently so that, even with the attenuation by the percent control circuitry 90, the signal at the terminal 154 becomes equal to that applied at the terminal 146. This condition ensues when the voltage at the terminal 186 exceeds the voltage at the output of the amplifier 180 by a predetermined fraction, the predetermined fraction dependent upon the settings of the percent control circuitry 90.

The circuit of FIG. 5(a) can thus be seen to operate in a similar fashion to that of FIG. 4(a), in controlling the application of energy in the welding cycle.

Since the output signal of the amplifier 180 can remain substantially constant for a long period of time, memory reset circuitry is provided to reset its value at zero following the completion of a welding cycle and preparatory to operation of the memory circuit during the next successive cycle. The memory reset circuitry includes a normally closed contact 190 and a relay 192 (see FIG. 5(d)) connected in series with a contact 194 and a diode 196. The left-hand terminal of the contact 194 is connected to a source of positive voltage. The contact 194 is a mechanical contact which opens in response to the action of the hydraulic system, at the termination of the upset cycle, actuating the relay 192 and closing the contact 190. The closing of the contact 190 alters the feedback of the operational amplifier 180 such that its output returns to zero by discharging a capacitor 195.

The contact 184 is controlled by a relay 200 connected in series with a normally-closed mechanical contact 202 and a diode 204 (FIG. 5(d)). A source of negative voltage is connected to the left-hand terminal of the contact 202. The normally-closed contact 202 responds to the movable platen 36 coming within a predetermined distance of the stationary platen 34 (indicating the completion of flashing) to cause the contact 202 to open, deactuating the relay 200, causing the contact 184 to reopen to its normal condition. This action, as explained above, cuts off the memory circuitry from the receipt of any further indications of instantaneous power being consumed in the welding cycle, and causes the output of the amplifier 180 to remain constant, to represent the flashing energy.

The percent control circuitry of this alternative embodiment is capable of establishing dual ranges of adjustability for that ratio of the voltages at the terminals 186 and 146 to cause the output of the amplifier 82 to change state. This is useful because the range of desirable ratios of upset and flashing energies differ between welding alloys and welding normal steels.

The percent control circuitry 90 includes a selector switch 210 for selecting whether a range appropriate for alloy welding, or for normal steel welding, is desired. The percent control circuitry also includes a pair of resistors 212, 214 and two potentiometers 216, 218.

For operation in welding alloy-type metals, the switch 210 is moved to its left position. Under these conditions, the voltage appearing at the terminal 186 passes through the potentiometer 218 and the resistor 214, to appear ultimately at the terminal 154 of the amplifier 82. For welding normal materials, the switch 210 is placed in its right-hand position, removing the potentiometer 218 and resistor 214 from the circuitry, and inserting in their place the potentiometer 216 and the resistor 212. If the settings on the potentiometers 216, 218 are different, then throwing the switch 210 determines which of two ratios of upset to flashing energies is applied in the welding cycle. This feature introduces greater flexibility to the system, and allows presetting the two potentiometer values, which may subsequently be selected by simply moving the position of the switch 210.

It is to be understood that the embodiments of the invention described herein are intended as illustrative rather than exhaustive and that changes, adaptations, additions or modifications can be made to the described subject matter by those of ordinary skill without departing from the spirit or the scope of the invention as described here and in the appended claims.

What is claimed is:

1. A system for executing a welding cycle including a flashing step and an upset step for flash welding together workpiece surfaces, the system comprising:
   (a) apparatus for executing an initial flashing step comprising:
      (i) apparatus for moving the workpiece surfaces toward each other, and
      (ii) means for applying electrical energy between the workpiece surfaces during such motion to cause flash heating of the surfaces;
   (b) apparatus for continuously monitoring the amount of electrical energy applied during the welding cycle, including during the flashing step, by producing a total energy output signal continuously representing the instantaneous time integrated electrical power applied during the welding cycle; and
   (c) apparatus for subsequently executing an upsetting step, comprising:
      (i) apparatus for forcing the workpiece surfaces together subsequent to the flashing step; and
      (ii) control circuitry for continuing the application of electrical energy to the workpieces for a time during the upsetting step, said time being a function of the amount of electrical energy applied during the flashing step,
   (d) said control circuitry comprising:
      (i) memory circuitry responsive to the energy monitor for storing a signal representing the amount of electrical energy applied during the flashing step;
      (ii) comparing circuitry connected to said energy monitor and said memory circuit for indicating the value of the stored signal relative to that of the total energy output signal, and
      (iii) output logic circuitry responsive to the comparing circuitry for terminating the electrical energy application when the comparing means indicates that the value represented by the energy monitor total energy output signal exceeds the value represented by the stored signal by a predetermined function of the stored signal value.

2. The system of claim 1, further comprising:
   input logic circuitry connected between the energy monitor, the memory circuit and the comparing circuitry for disconnecting the memory circuit from the energy monitor at the end of the flashing step, while continuing the application of the total energy output signal to the comparing circuitry during the entire welding cycle.

3. The system of claim 1, wherein:
   (a) said comparing circuitry comprises an operational amplifier having an inverting input and a noninverting input, and
   (b) said memory circuit comprises a capacitor connected to receive the output signal from said energy monitor and to develop a voltage which is a function of the value of the total energy output signal, said capacitor being connected to apply said voltage to said noninverting input terminal.

4. The system of claim 3, wherein said input logic comprises:
a relay contact connected between said energy monitor and said capacitor, the relay contact being connected to disconnect said capacitor from said energy monitor at the end of the flashing portion of the welding cycle.

5. The system of claim 1, wherein:
(a) said memory circuit comprises an operational amplifier connected to receive a power output signal of said energy monitor and to produce an output signal which is a function of said energy monitor output signal, and (b) said comparing circuitry comprises a summing amplifier having a noninverting input terminal connected to said operational amplifier output and an inverting input terminal connected to receive at least a portion of the total energy output signals.

6. The system of claim 5, further comprising:
percent control circuitry for adjusting said predetermined function including at least two potentiometers separately switchable into series connection between said energy monitor output and said inverting input terminal.

7. The system of claim 1, further comprising:
percent control circuitry comprising a potentiometer connected between the energy monitor and said noninverting input terminal to adjust said predetermined function.

* * * * *